US012719319B2

(12) United States Patent
Bork et al.

(10) Patent No.: US 12,719,319 B2
(45) Date of Patent: Aug. 25, 2026

(54) ROTOR WITH PERMANENT MAGNETS AND PERMANENT MAGNET SLOTS HAVING U-SHAPE SLOTS WITH CURVED ENDS AND OBTUSE ANGLES

(71) Applicant: WEG Equipamentos Elètricos S/A, Jaraguá do Sul (BR)

(72) Inventors: Briam Cavalca Bork, Jaraguá do Sul (BR); Fernando Jose Luchini, Jaraguá do Sul (BR)

(73) Assignee: WEG Equipamentos Elètricos S/A, Jaraguá do Sul (BR)

( * ) Notice: Subject to any disclaimer, the term of this patent is extended or adjusted under 35 U.S.C. 154(b) by 204 days.

(21) Appl. No.: 18/618,886

(22) Filed: Mar. 27, 2024

(65) Prior Publication Data

US 2025/0192627 A1 Jun. 12, 2025

(30) Foreign Application Priority Data

Dec. 12, 2023 (BR) .......................... 1020230261620

(51) Int. Cl.
*H02K 1/27* (2022.01)
*H02K 1/276* (2022.01)

(52) U.S. Cl.
CPC .................................... *H02K 1/276* (2013.01)

(58) Field of Classification Search
CPC ........ H02K 1/27; H02K 1/276; H02K 1/2766; H02K 1/2773; H02K 1/28; H02K 1/2706; H02K 1/246; H02K 1/2713; H02K 1/272; H02K 1/2726; H02K 1/2733; H02K 1/26; H02K 2213/03
See application file for complete search history.

(56) References Cited

U.S. PATENT DOCUMENTS

| | | | | |
|---|---|---|---|---|
| 2,913,607 A * | 11/1959 | Douglas | H02K 19/14 | 310/216.107 |
| 6,121,706 A * | 9/2000 | Nashiki | H02K 1/246 | 310/216.106 |
| 6,177,745 B1 * | 1/2001 | Narita | H02K 1/2766 | 310/156.43 |
| 6,218,753 B1 * | 4/2001 | Asano | H02K 1/276 | 310/156.53 |
| 7,459,821 B2 * | 12/2008 | Ho Cheong | H02K 15/03 | 310/156.56 |

(Continued)

*Primary Examiner* — Maged M Almawri
(74) *Attorney, Agent, or Firm* — Meunier Carlin & Curfman LLC

(57) ABSTRACT

A rotor includes a rotor package mounted on a shaft and a plurality of slot sets into which permanent magnets are inserted, each set of grooves comprises: a first radially outermost slot having a substantially U-shape with a central straight segment and two mirrored opposing lateral segments, wherein each of the mirrored opposing lateral segments makes an obtuse angle α with the central segment; and second and third radially innermost slots mirroring each other, each of the second and third slots comprising a first and a second straight segments making an angle obtuse β between themselves. Each of the mirrored opposing lateral segments of the first slot and each of the second straight segments of the second and third slots comprising an end at which curved grooves are formed.

8 Claims, 3 Drawing Sheets

(56) References Cited

U.S. PATENT DOCUMENTS 8,089,190 B2 * 1/2012 Lee ........................ H02K 1/276 310/156.53
8,749,109 B2 * 6/2014 Lendenmann ......... H02K 1/246 310/216.106
8,803,394 B2 * 8/2014 Sano .................... H02K 1/2766 310/216.106
8,860,275 B2 * 10/2014 Kaiser .................. H02K 1/2766 310/156.56
9,893,581 B2 * 2/2018 Kikuchi .................. B60L 50/61
10,153,672 B2 * 12/2018 Saito ..................... B60L 15/007
10,277,083 B2 * 4/2019 Ronchetto ................ H02K 1/22
10,622,853 B2 * 4/2020 Toda .................... H02K 23/405
10,715,017 B2 * 7/2020 Gieras .................. H02K 1/2746
11,139,704 B2 * 10/2021 Sakamoto ................ H02K 1/24
11,251,665 B2 * 2/2022 Hu ......................... H02K 3/487
11,456,634 B2 * 9/2022 Hu ......................... H02K 15/03
11,689,071 B2 * 6/2023 Hu ......................... H02K 1/276 310/156.56
12,095,311 B2 * 9/2024 Hu ......................... H02K 29/03
2007/0108853 A1 * 5/2007 Shah ...................... H02K 1/246 310/216.054
2007/0152527 A1 * 7/2007 Yura ...................... H02K 1/246 310/156.53
2012/0267977 A1 * 10/2012 Merwerth ............ H02K 1/2766 310/156.53
2013/0320797 A1 * 12/2013 Vyas .................... H02K 1/2766 310/156.43
2014/0346911 A1 * 11/2014 Tsuchida ................ H02K 1/246 310/156.53
2015/0015093 A1 * 1/2015 Gontermann .......... H02K 1/246 310/46
2015/0115758 A1 * 4/2015 Koka ..................... H02K 21/14 318/139
2015/0171684 A1 * 6/2015 McClelland ......... H02K 1/2766 310/156.07
2016/0285327 A1 * 9/2016 Sasaki .................... H02K 1/246
2016/0336823 A1 * 11/2016 Kikuchi ................. H02K 1/246
2017/0310171 A1 * 10/2017 Reddy .................... H02K 1/146
2017/0317540 A1 * 11/2017 Laldin .................. H02K 1/2766
2019/0109527 A1 * 4/2019 Takahashi .............. H02K 19/10
2020/0259377 A1 * 8/2020 Gangi .................. H02K 1/2766
2020/0395799 A1 * 12/2020 Hu ....................... H02K 1/2766
2021/0044167 A1 * 2/2021 Huang ................... H02K 29/03
2022/0131433 A1 * 4/2022 Hirano ................. H02K 1/2766
2023/0198322 A1 * 6/2023 Tremelling .......... H02K 19/103 310/46
2023/0412018 A1 * 12/2023 Saito ...................... H02K 1/276

* cited by examiner

ROTOR WITH PERMANENT MAGNETS AND PERMANENT MAGNET SLOTS HAVING U-SHAPE SLOTS WITH CURVED ENDS AND OBTUSE ANGLES

FIELD OF INVENTION

The present invention relates to the field of rotating electrical machines and, more particularly, to reluctance machines, reluctance machines assisted by permanent magnets and permanent magnet machines.

BACKGROUND OF THE INVENTION

Electrical machines are equipment used to transform electrical energy into mechanical energy, in the case of engines, and vice versa, in the case of generators. They are generally formed by a rotor, which is the rotating energized component, a static element called stator, equally energized, bearings responsible for connecting the static and rotating parts, and the housing that constitutes not only the role of enclosure of the systems already mentioned, but promotes integration with other auxiliary systems.

In the case of reluctance machines, with pure reluctance or being assisted by permanent magnets, the rotor is specifically designed to maximize the variation of magnetic reluctance when the motor is in operation, and when the reluctance machine is assisted by permanent magnets, the use of a permanent magnet assists in the magnetic flux, thus obtaining higher levels of efficiency and making it possible to reduce the size of the housing.

In the case of permanent magnet machines, the rotor has permanent magnets to produce excitation. The use of permanent magnets reduces Joule losses in the rotor, thus obtaining higher levels of efficiency and making it possible to reduce the size of the housing and increase the useful life of the machine.

A potential problem associated with reluctance machines, permanent magnet assisted reluctance machines and permanent magnet machines is so-called torque ripple. This is a fluctuation in the output torque of the energized machine, which influences the operational stability and reliability of the machine.

It is known from the prior art that the production of torque ripple is related to changes in the waveform of the counter electromotive force.

Since such changes are influenced by the physical parameters of the stator and rotor, prior art solutions for eliminating, or reducing, torque ripple are generally based on the design of the electrical machine.

Despite the optimization solutions known in the prior art, the need remains for a permanent magnet electrical machine solution that is capable of substantially reducing the machine's torque ripple, while maintaining the construction of the machine components with the same least complexity possible.

OBJECTIVES OF THE INVENTION

It is one of the objectives of the present invention to provide a rotor for an electric reluctance machine, permanent magnet assisted reluctance machine or permanent magnet machine that is capable of substantially reducing the torque ripple of the machine.

It is a further objective of the present invention to provide a rotor for an electric reluctance machine, permanent magnet assisted reluctance machine or permanent magnet machine that is capable of substantially reducing the torque ripple of the machine based on the optimization of flow barriers in the region between the rotor slots and the machine air gap.

It is yet another object of the present invention to provide a rotor for an electric reluctance machine, permanent magnet assisted reluctance machine or permanent magnet machine that is capable of substantially reducing the torque ripple of the machine based on a combination of geometric changes to the rotor design.

BRIEF DESCRIPTION OF THE INVENTION

The present invention achieves the above objects by means of a rotor for a rotating electrical machine, the rotor comprising a rotor package mounted on a shaft, the rotor package comprising a plurality of sets of slots that can receive permanent magnets. Each set of slots comprises:

a first radially outermost slot having a substantially U-shape with a central straight segment and two opposing straight lateral segments, wherein each of the opposing lateral segments makes an obtuse angle $\alpha$ with the central segment and comprises an end wherein opposing curved grooves are formed and wherein each of the opposing curved grooves of each opposing lateral straight segment forms a radius R1 centered at a point collinear with a straight edge of such opposing lateral straight segment; and second and third radially innermost slots, each of the second and third slots comprising a first and a second straight segments making an obtuse angle $\beta$ to each other, wherein the second straight segment of each of the second and third slots comprises an end wherein opposing curved grooves are formed and wherein each of the opposing curved grooves forms a radius R2 centered at a point collinear with a straight edge of such second straight segment.

In one embodiment of the invention, the two opposing lateral straight segments of the first slot are mirrored segments and the second and third radially innermost slots are mirrored to each other.

The rotor package comprises, in an embodiment of the invention, four sets of slots equally spaced apart.

In an embodiment of the present invention, the obtuse angle $\alpha$ is greater than 90° and less than 180°. Even more preferably, the angle $\alpha$ is 90°+(180°/number of poles).

In an embodiment of the present invention, the obtuse angle $\beta$ is greater than 90° and less than 180°. Even more preferably, the angle $\alpha$ is 90°+(180°/number of poles).

The radius R1 is preferably in the range between 0.4 mm and 25 mm and the radius R2 is preferably in the range between 0.4 mm and 22 mm.

In yet another embodiment of the present invention, the first slot is positioned in the rotor package so that an extreme straight portion of the ends of the mirrored opposing straight lateral segments is spaced from a circular outer edge of the rotor package by a maximum distance D1 and a minimum distance D2.

Preferably, the maximum distance D1 is in the range between 0.5 mm and 15 mm and the minimum distance D2 is in the range between 0.25 mm and 15 mm.

In one embodiment of the present invention, the second slot is positioned in the rotor package so that an extreme straight portion of its second straight segment is spaced from a circular outer edge of the rotor package by a maximum distance A1 and a minimum distance A2; and the third slot is positioned in the rotor package so that an extreme straight portion of its second straight segment is spaced from a circular outer edge of the rotor package by the maximum distance A1 and the minimum distance A2.

Preferably, the maximum distance A1 is in the range between 0.5 mm and 15 mm and the minimum distance A2 is in the range between 0.25 mm and 15 mm.

In embodiments of the present invention, the first straight segments of the second and third slots are parallel to the central segment of the first slot and spaced therefrom by a distance E. The distance E is preferably in the range between 1 mm and 30 mm.

Furthermore, in embodiments of the present invention, each of the first straight segments of the second and third slots is spaced from a circular edge of a central hole of the rotor package by a minimum distance F. The minimum distance F is preferably in the range between 4 mm and 200 mm.

In an alternative embodiment of the invention, at least one end of the slots of the slot package is a straight end with curved corners.

The present invention further relates to a rotating permanent magnet electrical machine comprising a stator and a rotor in accordance with the present invention.

BRIEF DESCRIPTION OF THE DRAWINGS

The present invention will be described below in more detail, with references to the attached drawings, in which.

DETAILED DESCRIPTION OF THE INVENTION

The present invention will be described below based on preferred embodiments shown in FIGS. 1 to 6. Although the present detailed description is carried out based on a permanent magnet rotating electrical machine, the present invention could also be applied to pure reluctance machines, without the use of magnets.

Figure 1:
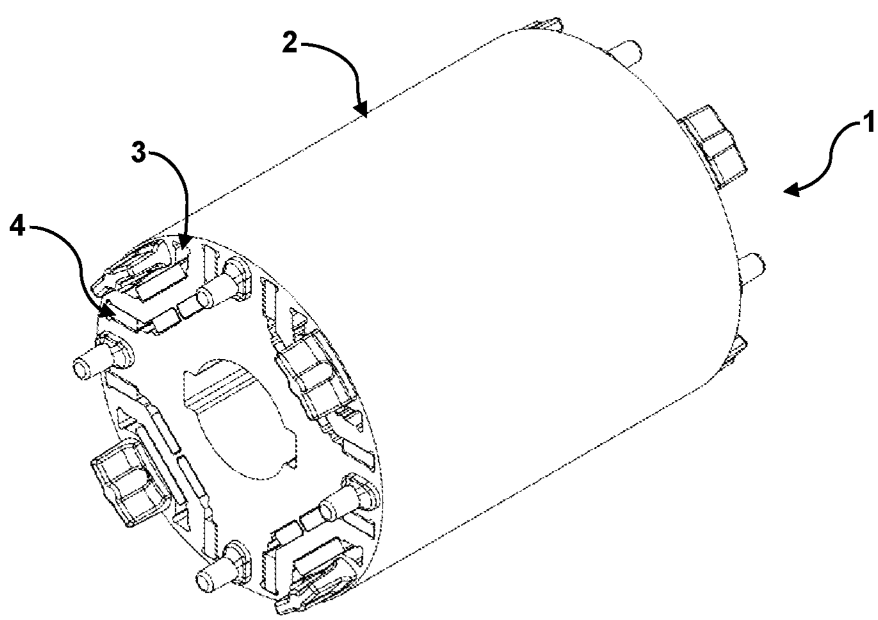
FIG. 1—is a perspective view of a rotor for a permanent magnet rotating electrical machine according to an embodiment of the present invention.

FIG. 1 shows a rotor 1 of a rotating permanent magnet electrical machine, whether it is a motor or a generator, with the shaft on which it is mounted removed. The rotor 1 comprises a sheet package or rotor package 2, with a plurality of sets of slots 3 into which permanent magnets 4 are inserted. The construction and function of this type of rotor with internal permanent magnets is known to those skilled in the art, so they will be detailed in this description, but only the elements and characteristics necessary for a person skilled in the art to fully understand the invention.

Figure 2:
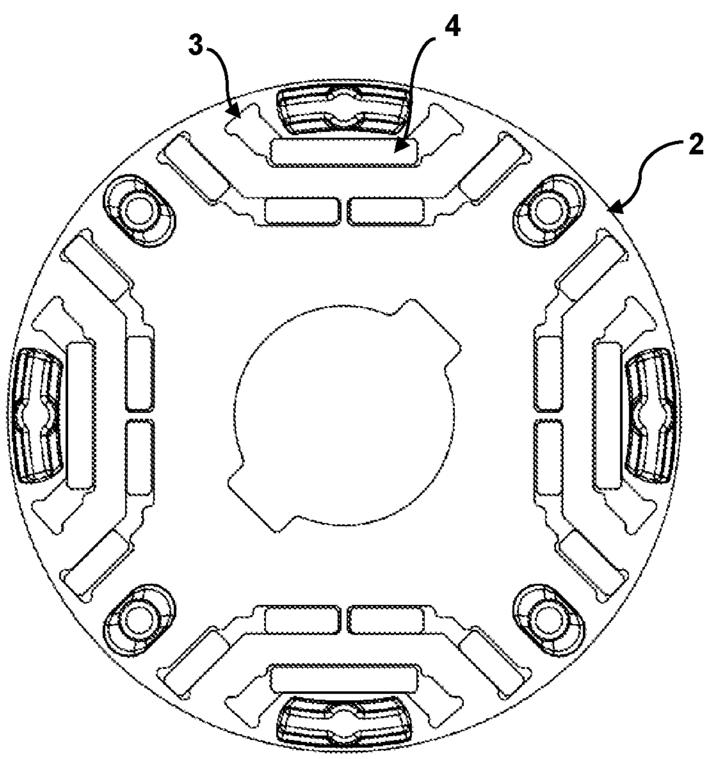
FIG. 2—is a front view of the rotor for a permanent magnet rotating electrical machine according to an embodiment of the present invention.

As best illustrated in FIG. 2, in the first embodiment of the invention illustrated in FIGS. 1 to 4, the rotor package 2 has a substantially cylindrical shape, defining an outer circular edge, and comprises four sets of slots distributed close to the outer periphery of the package.

Figure 3:
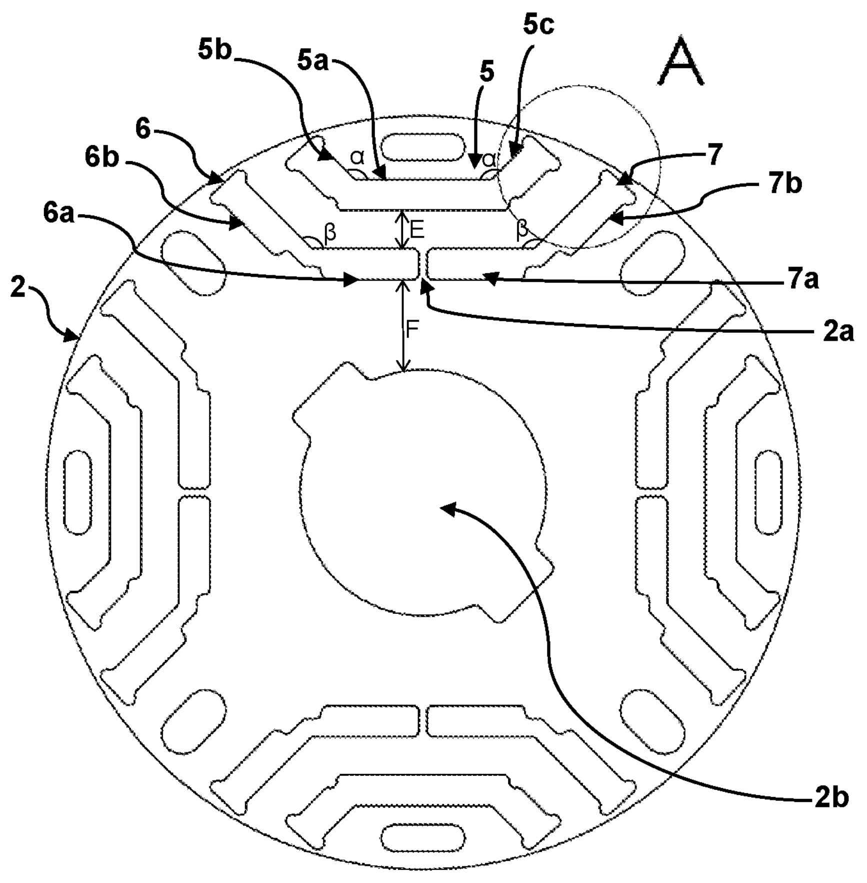
FIG. 3—is a front view of the rotor sheet package for a permanent magnet rotating electrical machine according to an embodiment of the present invention.

FIG. 3 shows the rotor package 2 without the magnets. As can be seen in this figure, each of the sets of slots comprises at least one first radially outermost slot 5 and two radially innermost slots 6, 7. Additional slots may be provided, as soon as they follow the shape of the slots 5 or 6, 7.

The first slot 5 comprises a substantially U-shape with three straight segments: a central segment 5*a* and two mirror-opposing lateral segments 5*b*, 5*c* that each make an obtuse angle α with the central segment 5*a*. Each of the mirror-opposing lateral segments 5*b*, 5*c* comprises an end at which curved grooves 5*d*, 5*e* are formed.

In a preferred embodiment of the present invention, the obtuse angle α is greater than 90° and less than 180°, being defined as a function of the polarity of the electric motor.

Thus, in even more preferred configurations of the invention, angle α is given by the formula 90°+(180°/n), where n is the number of poles of the motor.

Thus, for example, the angle α could assume the values in the following table:

TABLE I

Examples of angle α

| Number of poles | Preferred angle (°) |
|---|---|
| 4 | 180 |
| 6 | 135 |
| 8 | 120 |
| 10 | 112.5 |
| 12 | 108 |
| 14 | 105 |
| 16 | 102.86 |
| 18 | 100 |
| 20 | 99 |

Figure 4:
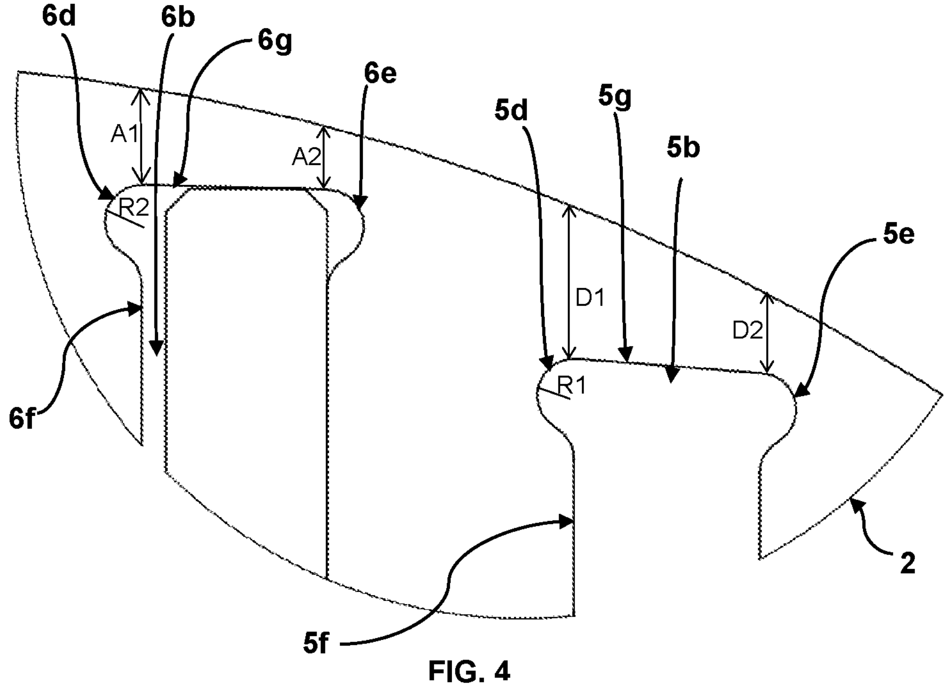
FIG. 4—is an enlarged and detailed view of a portion of the set of slots of the rotor sheet package for a permanent magnet rotating electrical machine in accordance with an embodiment of the present invention.

As best illustrated in FIG. 4, each of the curved grooves 5*d*, 5*e* forms a radius R1 centered at a point collinear with the straight edge 5*f* of the lateral segment 5*b*.

Furthermore, as also best illustrated in FIG. 4, the first slot 5 is positioned in the package 2 so that a straight edge portion 5*g* of the ends of the lateral segments 5*b*, 5*c* of the slots is spaced from the outer edge of the package 2 by a maximum distance D1 and a minimum distance D2, considering the circular profile of the edge.

In a preferred embodiment of the present invention, the radius R1 is in the range between 0.4 mm and 25 mm, the maximum distance D1 is in the range between 0.5 mm and 15 mm and the minimum distance D2 is in the range between 0.25 mm and 15 mm. Even more preferably, the radius R1 is less than 2 mm, the maximum distance D1 is 5 mm and the minimum distance D2 is between 0.25 and 5 mm.

As mentioned previously, the two lateral segments 5*b*, 5*c* are preferably mirrored, so that the same radius R1 and distances D1, D2 shown in FIG. 4 in relation to the lateral segment 5*b* are found in a mirrored way in the lateral segment 5*c*. It should be understood, however, that in alternative embodiments, there could be an asymmetry between the lateral segments 5*b* and 5*c*, with distances D1 and D2, and radius R1 and R2 within the ranges described.

Regarding to FIG. 3, the radially innermost slots, second and third slots 6, 7, have, taken together, a similar shape to the first slot 5, except for the fact that they are non-contiguous, that is, they are divided and separated by a portion of package 2*a*.

Since the third slot 7 is dimensionally identical and mirrored in relation to the second slot 6, the following description will focus on slot 6.

Slot 6 comprises two straight segments 6*a*, 6*b* that make an obtuse angle β between them. In a preferred embodiment of the present invention, the angle β is greater than 90° and less than 180°, being defined as a function of the polarity of the electric motor.

Thus, in even more preferred embodiments of the invention, angle β is given by the formula 90°+(180°/n), where n is the number of poles of the motor.

Thus, for example, angle β could assume the values in the following table:

TABLE II

| Examples of angle β | |
|---|---|
| Number of poles | Preferred angle (°) |
| 4 | 180 |
| 6 | 135 |
| 8 | 120 |
| 10 | 112.5 |
| 12 | 108 |
| 14 | 105 |
| 16 | 102.86 |
| 18 | 100 |
| 20 | 99 |

In a preferred embodiment of the invention, the angles α and β are equal, so that there is no narrowing in the reluctance path. However, in alternative embodiments of the invention, such angles could be different.

In the embodiment shown in FIGS. 1 to 4, the first straight segment 6*a* of the second slot 6 is parallel to the central segment 5*a* of the first slot 5 and spaced therefrom by a distance E. In a preferred embodiment of the present invention, the distance E is in range between 1 mm and 30 mm.

The second straight segment 6*b* of the second slot 6 comprises an end at which curved grooves 6*d*, 6*e* are formed (see FIG. 4).

Each of the curved grooves 6*d*, 6*e* forms a radius R2 centered at a point collinear with the straight edge 6*f* of the lateral segment 6*b*.

Furthermore, as also best illustrated in FIG. 4, the second slot 6 is positioned in the package 2 so that a straight edge portion 6*g* of the second straight segment 6*b* is spaced from the outer edge of the package 2 by a maximum distance A1 and a minimum distance A2, considering the circular profile of the edge.

In a preferred embodiment of the present invention, the radius R2 is in the range between 0.4 mm and 22 mm, the maximum distance A1 is in the range between 0.5 mm and 15 mm and the minimum distance A2 is in the range between 0.25 mm and 15 mm. Even more preferably, the radius R2 is less than 2 mm, the maximum distance A1 is 5 mm and the minimum distance A2 is between 0.25 and 5 mm.

In one embodiment of the invention, the first straight segment 6*a* of the second slot is away from the circular edge of the central hole 2*b* of the rotor package 2 by a minimum distance F. In a preferred embodiment of the present invention, the distance F is in the range between 4 mm and 200 mm.

As mentioned previously, in a first embodiment of the invention, the third slot 7 has a mirrored shape in relation to the second slot 6, with a first and second straight segments 7*a*, 7*b* with the angle β between them, and with the curved grooves formed at the end of the second segment 7*b*. It should be understood, however, that such mirroring might not be present in alternative embodiments of the invention.

The combination of the shape of the first, second and third slots 5, 6 and 7 of each set of slots 3 with, mainly, the existence of the curved grooves 5*d*, 5*e* and 6*d*, 6*e* of the slots has a significant impact on reducing the motor torque ripple.

In fact, such changes in the geometry of the rotor design interfere with the adjustment of the flow barriers in the region between the slots and the air gap.

Figure 5:
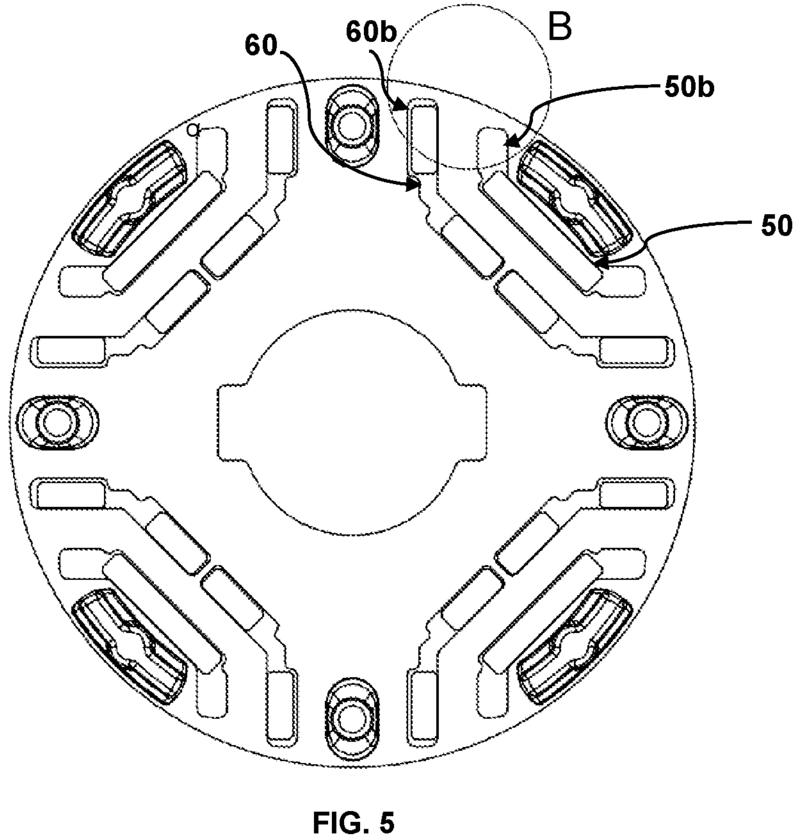
FIG. 5—is a front view of the rotor sheet package for a permanent magnet rotating electrical machine according to an alternative embodiment of the present invention.
Figure 6:
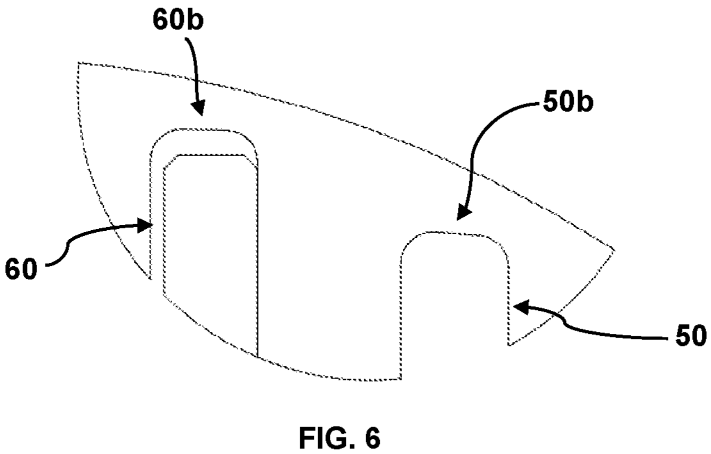
FIG. 6—is an enlarged and detailed view of a portion of the set of slots of the rotor sheet package for a permanent magnet rotating electrical machine according to an alternative embodiment of the present invention.

FIGS. 5 and 6 show an alternative embodiment of the invention, in which at least one of the ends 50*b* and 60*b* of the slots 50 and 60 is a straight end with curved corners.

In the embodiment of FIGS. 5 and 6, the two ends of the slots 50 and 60 are straight ends with curved corners and the other shape characteristics are similar to the embodiment of FIGS. 1 to 4. It should be noted, however, that in embodiments of the invention, the slots could have a straight end with curved corners and the other end with a shape similar to the ends with curved grooves of FIGS. 1 to 4.

In this sense, the combination of the shape of the first, second and third slots with the existence of the curved ends 50*b* and 60*b* of the slots has a significant impact on reducing the motor torque ripple.

In embodiments of the invention, the plurality of sets of slots 3 of the sheet package or rotor package 2 may have both a set of slots 3 like the sets of the embodiment of FIGS. 1 to 4 and a set of slots 3 like the sets of the embodiment of FIGS. 5 and 6.

Having described examples of preferred embodiments of the present invention, it must be understood that the scope of the present invention covers other possible variations of the described inventive concept, being limited only by the content of the claims alone, including possible equivalents.

The invention claimed is:

1. A rotor for a rotating electrical machine, the rotor comprising a rotor package mounted on a shaft, the rotor package comprising a plurality of sets of slots into which permanent magnets can be inserted, wherein each set of slots comprises: a first radially outermost slot having a substantially U-shape with a central straight segment and two opposing lateral straight segments, wherein each of the opposing straight lateral segments makes a first obtuse angle with the central segment and comprises an end at which opposing curved grooves are formed, and wherein each of the opposing curved grooves of each opposing straight lateral segment forms a radius R1 centered at a point collinear with a straight edge of such opposing mirrored lateral segment; and second and third radially innermost slots, each of the second and third slots comprising a first and a second straight segments that make a second obtuse angle with each other, wherein the second straight segment comprises an end at which opposing curved grooves are formed and wherein each of the opposing curved grooves forms a radius R2 centered at a point collinear with a straight edge of such a second straight segment.

2. The rotor, according to claim 1, wherein:

the two opposing lateral straight segments are mirrored segments; the second and third radially innermost slots are mirrored to each other; and the rotor package comprises four sets of slots equally spaced apart.

3. The rotor, according to claim 1, wherein:

the first obtuse angle is given by the formula 90°+(180°/n), where n is the number of poles of the rotating electrical machine;

the second obtuse angle is given by the formula 90°+(180°/n), where n is the number of poles of the rotating electrical machine;

the radius R1 is in the range between 0.4 mm and 25 mm; and the radius R2 is in the range between 0.4 mm and 22 mm.

4. The rotor according to claim 1, wherein the first groove is positioned in the rotor package so that a straight edge portion of the ends of the opposing lateral segments are spaced from a circular outer edge of the rotor package by a maximum distance D1 and a minimum distance D2; wherein the maximum distance D1 is in the range between 0.5 mm and 15 mm and the minimum distance D2 is in the range between 0.25 mm and 15 mm.

5. The rotor, according to claim 1, wherein:

the second slot is positioned in the rotor package such that a straight edge portion of the second straight segment is spaced from a circular outer edge of the rotor package by a maximum distance A1 and a minimum distance A2; and the third slot is positioned in the rotor package such that a straight edge portion of the second straight segment is spaced from a circular outer edge of the rotor package by the maximum distance A1 and the minimum distance A2;

wherein the maximum distance A1 is in the range between 0.5 mm and 15 mm and the minimum distance A2 is in the range between 0.25 mm and 15 mm.

6. A permanent magnet rotating electric machine comprising:

a stator; and a rotor comprising a rotor package mounted on a shaft, the rotor package comprising a plurality of sets of slots into which permanent magnets are inserted;

wherein the rotor is a rotor as defined in claim 1.

7. The rotor, according to claim 1, wherein the first straight segments of the second and third slots are parallel to the central segment of the first slot and spaced therefrom by a distance E, where the distance E is in the range between 1 mm and 30 mm.

8. The rotor, according to claim 7, wherein each of the first straight segments of the second and third slots is away from a circular edge of a central hole from the rotor package by a minimum distance F, wherein the minimum distance F is in the range between 4 mm and 200 mm.

* * * * *